(12) United States Patent
Reiners (10) Patent No.: US 9,828,078 B2
(45) Date of Patent: Nov. 28, 2017

(54) STEERING ARRANGEMENT (71) Applicant: Wolfram Johannes Bernd Reiners, Cape Town (ZA)

(72) Inventor: Wolfram Johannes Bernd Reiners, Cape Town (ZA)

(*) Notice: Subject to any disclaimer, the term of this patent is extended or adjusted under 35 U.S.C. 154(b) by 0 days.

(21) Appl. No.: 14/907,206

(22) PCT Filed: Jul. 25, 2014

(86) PCT No.: PCT/ZA2014/000033
§ 371 (c)(1),
(2) Date: Jan. 22, 2016

(87) PCT Pub. No.: WO2015/013728
PCT Pub. Date: Jan. 29, 2015

(65) Prior Publication Data
US 2016/0159448 A1    Jun. 9, 2016

(30) Foreign Application Priority Data

Jul. 25, 2013  (ZA) .................................. 2013/05642

(51) Int. Cl.
*B63H 9/04* (2006.01)
*B63H 9/06* (2006.01)

(52) U.S. Cl.
CPC .................. *B63H 9/0685* (2013.01)

(58) Field of Classification Search
CPC .................................................. B63H 9/0685
See application file for complete search history.

(56) References Cited

U.S. PATENT DOCUMENTS 6,877,697 B2 *  4/2005  Bellacera ............ B63B 35/7979
242/388.6

FOREIGN PATENT DOCUMENTS

| DE | 202006018499 U1 | 3/2007 |
| DE | 202011102743 U1 | 1/2013 |
| WO | 2005100147 A1 | 10/2005 |
| WO | 2008031446 A2 | 3/2008 |

OTHER PUBLICATIONS

Search Report from PCT/ZA2014/000033, dated Oct. 7, 2015.

* cited by examiner

*Primary Examiner* — Stephen Avila
(74) *Attorney, Agent, or Firm* — Fay Sharpe LLP (57) ABSTRACT According to a first aspect of the invention there is provided a steering arrangement for steering a kite driven watercraft (14) which includes a mounting member (base, 20) which is configured to be mounted on a watercraft (14), a first connecting member for connecting a leading edge region (16) of a canopy (12) of the kite to the mounting member, a second connecting member for connecting a trailing edge region (18) of the canopy (12) to the mounting member and a control device for controlling the displacement of the canopy relative to the watercraft via at least the second connecting member.

39 Claims, 13 Drawing Sheets

STEERING ARRANGEMENT

FIELD OF THE INVENTION

The invention relates to a steering arrangement. More particularly, the invention relates to a steering arrangement for steering a kite driven watercraft.

BACKGROUND TO THE INVENTION

The inventor is aware of conventional devices used for steering a canopy of a kite, which device consists of a bar which is arranged displaceably about a central line, with the central line extending between the user and a leading edge of the canopy, with further lines extending between the bar and the rear of the canopy. A user would hold the bar with one hand placed left and one right to the centre line.

During the steering process the pilot would be able to "feel" the pull of the canopy on the kite connecting lines, and would also be able to observe the position of the canopy in the air. The above enables the user to effectively steer the kite in the required direction relative to the direction of the wind, and also to vary the angle of attack of the wind relative to the kite, thereby varying the pulling force of the kite.

It can be appreciated that the steering of a kite in circumstances where a user is remotely located from the kite, or where the kite have to be steered when the kite cannot be visually detected, can be problematic.

The Applicant therefor believes that a steering arrangement as described herein below is advantageous in that it enables the effective steering a canopy of a kite driven watercraft in circumstances where the canopy's position in the air is not visible, and/or where the user is not in direct contact with the kite connecting lines.

SUMMARY OF THE INVENTION

According to a first aspect of the invention there is provided a steering arrangement for steering a kite driven watercraft which includes:— a mounting member which is configured to be mounted on a watercraft;

a first connecting member for connecting a leading edge region of a canopy of the kite to the mounting member;

a second connecting member for connecting a trailing edge region of the canopy to the mounting member; and a control device for controlling the displacement of the canopy relative the watercraft via at least the second connecting member.

The mounting member is typically in the form of a base which is shaped and configured to be mounted displaceably the watercraft. The base may be generally disc shaped in form. The mounting member may be of any geometrical suitable shape and size for allowing the mounting member to be mounted displaceably relative the watercraft.

The mounting member may include a sensor for sensing the position and/or orientation of the mounting member relative to the watercraft. The sensor may include a gear arrangement. The gear arrangement may be in the form of a rack and pinion gear arrangement with the rack defined on a peripheral region of the mounting member. It is to be appreciated that the sensor may also be in the form of any suitable conventional electronic device which is configured to sense the orientation of the mounting member relative to the watercraft. The mounting member may also include a transmitter for transmitting the position and/or orientation of the mounting member relative the watercraft, to the control device. The sensor may also include the transmitter.

The first connecting member may comprise an elongate member and a first length adjustment member for adjusting the length of the first elongate member.

The first elongate member will typically be in the form of any suitable conventional line and/or cable extending between the canopy and the mounting member and may also include a sensor for measuring the position and orientation of the line and/or cable relative to the watercraft. The sensor may include a rack and pinion arrangement. It is to be appreciated that the sensor may be in the form of any suitable conventional electronic device which is configured to sense the orientation of the line and/or cable relative to the watercraft.

The first elongate member may also include a transmitter for transmitting the position and/or orientation of the first elongate member relative the watercraft to the control device. The sensor may include the transmitter.

The first connecting member may also comprise a first angle adjustment member for adjusting the angle of the elongate member relative to the watercraft. The preferred angle will be determined by factors such as the wind speed and speed of the watercraft relative to the body of water.

The second connecting member may comprise a second elongate member for connecting the second connecting member to a trailing edge region of the canopy and a second length adjustment member for adjusting the length of the second elongate member.

The second elongate member will typically be in the form of any suitable conventional line and/or cable extending between the canopy and the mounting member and may also include a sensor for sensing the position and orientation of the line and/or cable relative to the watercraft. The sensor may include a rack and pinion arrangement. It is to be appreciated that the sensor may be in the form of any suitable conventional electronic device which is configured to sense the orientation of the line and/or cable relative to the watercraft.

The second elongate member may also include a transmitter for transmitting the position and/or orientation of the second elongate member relative the watercraft to the control device. The sensor may include the transmitter.

The second connecting member may also comprise a second angle adjustment member for adjusting the angle of the elongate member relative to the watercraft. The preferred angle will be determined by factors such as the wind speed and speed of the watercraft relative to the body of water.

Further sensors may be provided for sensing the tension in the first and/or second elongate members and to transmit the said tension so measured via a transmitter to the control device. The sensor may include the transmitter.

Due to factors such as the size of the canopy and the relative weight of the kite canopy and the lines and or cables, sleeve elements may be arranged co-axially about the lines and/or cables which when compressed together provides rigidity to the lines and or cable thereby facilitating transfer of the canopy and lines from a body of water onto a watercraft.

The control device will typically be remotely located from the mounting member. The control device may include a receiver which is configured to receive information from the transmitters, so as to enable a user of the control device to steer the canopy into a preferred zone relative the watercraft.

The control device may also include mechanical advantage members for amplifying and transferring output through the control device, onto the second and/or first connecting members.

According to a second aspect of the invention there is provided a kite driven watercraft including a steering arrangement as described above.

The watercraft may include a member for generating mechanical energy. The mechanical energy generating member may be in the form of hydro turbines, paddles and/or propellers configured to generate mechanical energy as the watercraft is pulled via the kite, on a body of water.

The watercraft may include energy converting member for converting one form of energy into another. The energy converting member may be in the form of a generator for converting mechanical energy into electrical energy. The generator may be operably connected to the mechanical energy generating member. The energy converting member may be configured to electrolyse seawater so as to produce hydrogen. The hydrogen may be combined with carbon dioxide to produce methanol and/or methane gas. The carbon dioxide may be in the form of dry ice stored on the watercraft.

The watercraft may include a storage member for storing energy. The energy storing member may be in the form of batteries for storing electrical energy. The energy storing member may be in the form of a reservoir for storing methane gas and/or methanol. The energy storing member may include cooling and compression devices to transform methane gas from gas into liquid form, for example LNG (liquefied natural gas), for effective storage and transportation thereof.

BRIEF DESCRIPTION OF THE DRAWINGS

The invention will now be described, by way of a non-limiting example, with reference to the accompanying drawings.

In the drawings:—

FIGS. 1a and b are perspective and plan views respectively of an embodiment of a kite driven watercraft including a steering arrangement, in accordance with the invention;

FIGS. 4a and b are perspective and plan views respectively, of a further embodiment of a kite driven watercraft including a steering arrangement, in accordance with the invention;

FIGS. 10a and b are schematic representations of an embodiment of a sensor including a gear arrangement arranged about the connecting members, in accordance with the invention;

DETAILED DESCRIPTION OF THE INVENTION

Referring now to the drawings, reference numeral 10 generally depicts a steering arrangement in accordance with the invention.

The steering arrangement for a kite driven watercraft includes a mounting member which is configured to be mounted on a watercraft 14, a first connecting member for connecting a leading edge region 16 of the canopy 12 to the mounting member, a second connecting member for connecting a trailing edge region 18 of the canopy 12 to the mounting member, and a control member for controlling the displacement of the canopy relative the watercraft via at least the second connecting member.

The mounting member is in the form of a base 20 which is mounted rotatably onto the watercraft 14, typically mounted rotatably onto the deck of a watercraft 14.

The first and second adjusting members are typically in the form of a first and second set of reels, 22 and 24, respectively. The first and second set of reels 22 and 24, are mounted on the base 20.

The first set of reels 22 is connected to the leading edge 16 of the canopy 12 via the first elongate member, in the form of a first set of kite connecting lines 26, while the second set of reels 24 is connected to the trailing edge 18 of the canopy 12, via the second elongate member, typically in the form of a second set of kite connecting lines 28.

Figure 1:
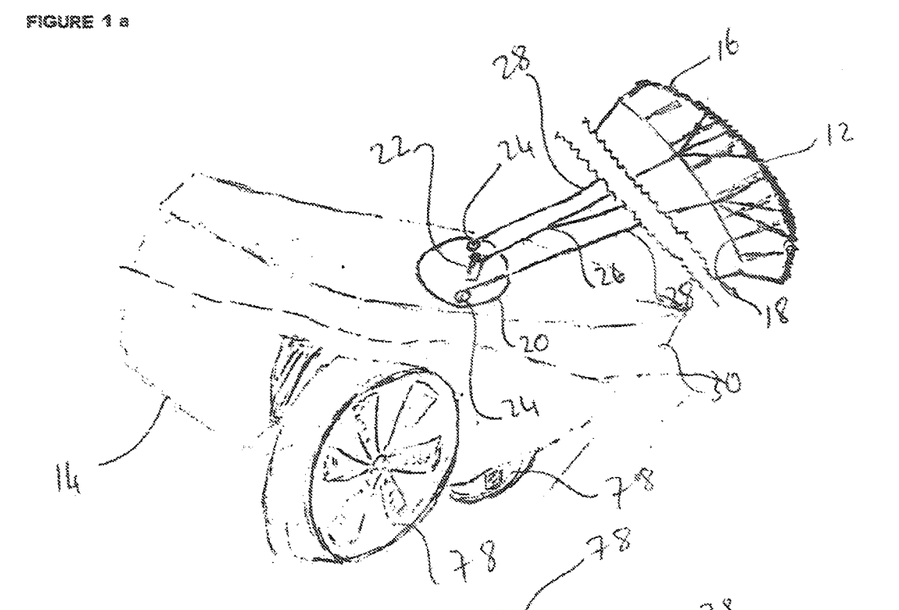
Figure 2:
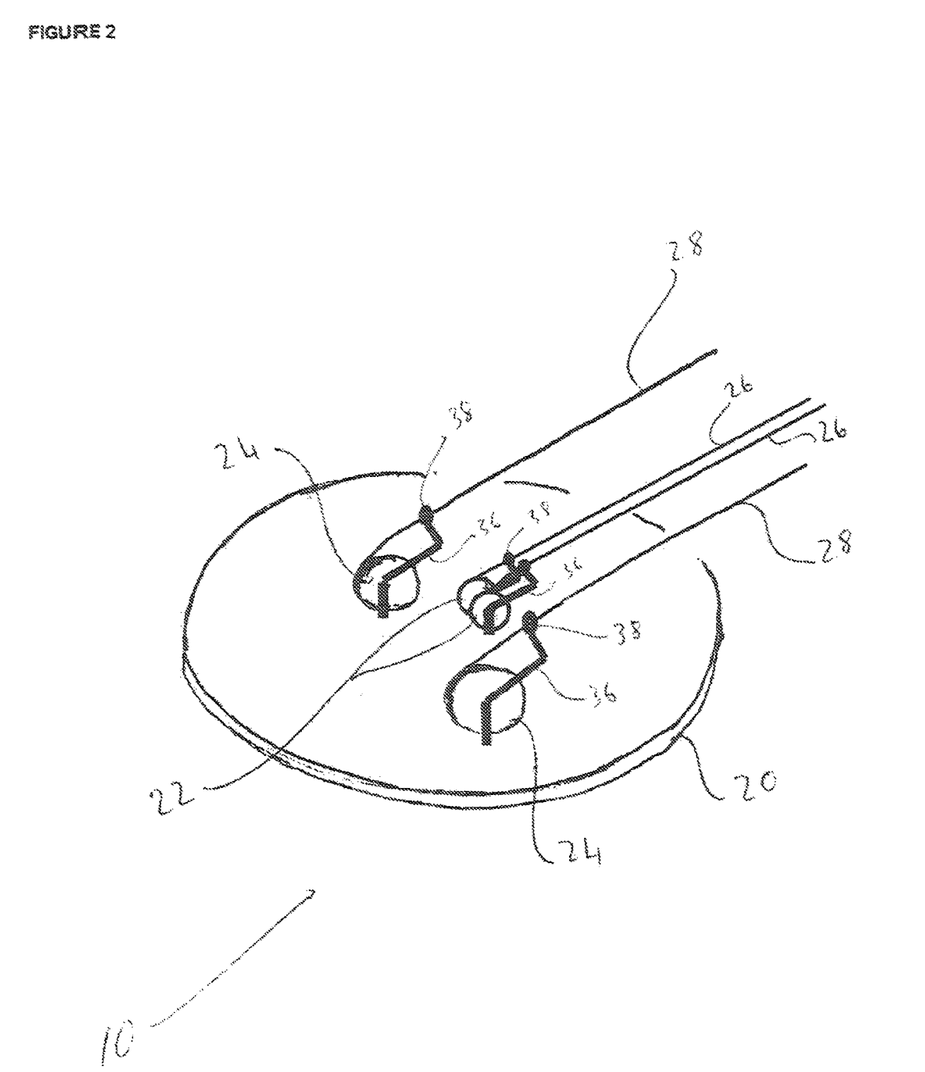
FIG. 2 is a perspective view of the mounting member and the first and second connecting members, in accordance with the invention.

The first set of kite connecting lines 26 is connected to opposing end portions of the leading edge region 16 of the canopy 12, while the second set of kite connecting lines 28 is connected to opposing ends of the trailing edge region 18 of the canopy 19. The first set of kite connecting lines 26 can be bridled so as to extend from the first set of reels 22 in singular form, as shown in FIG. 1a. The first and second set of kite connecting lines 26 and 28, will typically be connected to the canopy 12 at several points, which will allow for exact steering and controlling the movements of the kite canopy, as well as its pull (the kite's so called "power"), as depicted in FIGS. 1, 5, 7 and 8.

The first set of kite connecting lines 26 will typically be fixed in length during flying mode but can be reeled in for storage of the kite 12 via the first set of reels 22. The first as well as the second set of kite connecting lines, 26 and 28, are used to trim the canopy 12 and its yawing to neutral. The lengthening and shortening of the kite connecting lines 26 and 28 in order to trim the canopy 12 during flight is effected via the first and second set of reels 22 and 24, respectively.

The first and second set of reels 22 and 24 are typically driven via a mechanical advantage member via input received from the control member. The mechanical advantage member can be in the form of electro motors (not shown), which can drive the rotation of the reels 22 and 24 and withstand the strong pull of the canopy 12. The first and second set of reels 22 and 24 can also be in the form of deflector rolls, with reels that can retrieve and release the kite connecting lines 26 and 28, in a controlled way located under deck of the ship, as depicted in FIG. 10b.

Figure 9:
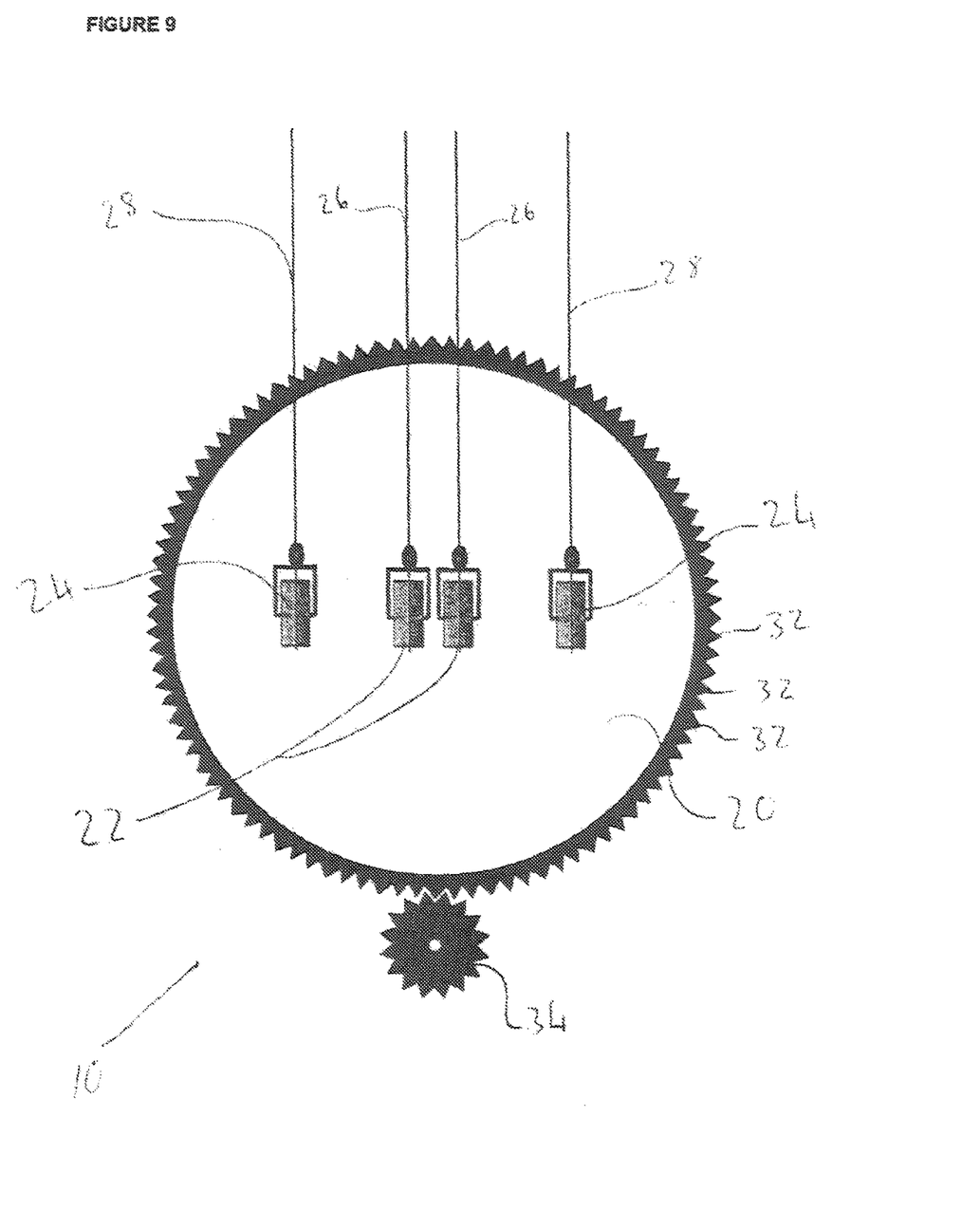
FIG. 9 is schematic representation of an embodiment of a sensor including a gear arrangement, in accordance with the invention.

The base 20 includes a sensor for sensing the orientation of the base 20, and thereby of the kite connecting lines 26 and 28 extending therefrom relative to the bow 30 of the watercraft 14. The sensor is typically defined by the base 12 having gear teeth 32 defined on an outer surface thereof, with the base 20 arranged in communication with cogwheel 34. Rotation of the base 20 will result in rotation of the cogwheel 34. The position of the base relative to the cogwheel 34 can be stored in a database (not shown) and transmitted by a transmitter (not shown) to the control device. The cogwheel 34 can be arranged to the outer of the base 20, as depicted in FIG. 9, or to the inside of the base 20, where the base 20 has gear teeth defined on an inner surface thereof (not shown). The sensor can also be in the form of a conventional electronic device which is configured to sense the orientation of the base relative the watercraft and to communicate the information to the control device thereby giving a user a real time indication of the orientation nf the canopy relative the watercraft.

The first and second set of reels 22 and 24, will typically also include sensors for sensing the orientation of the first and second set of kite connecting lines 26 and 28, extending from the first and second set of reels 22 and 24, relative to the bow 30 of the watercraft 14.

Figure 10:
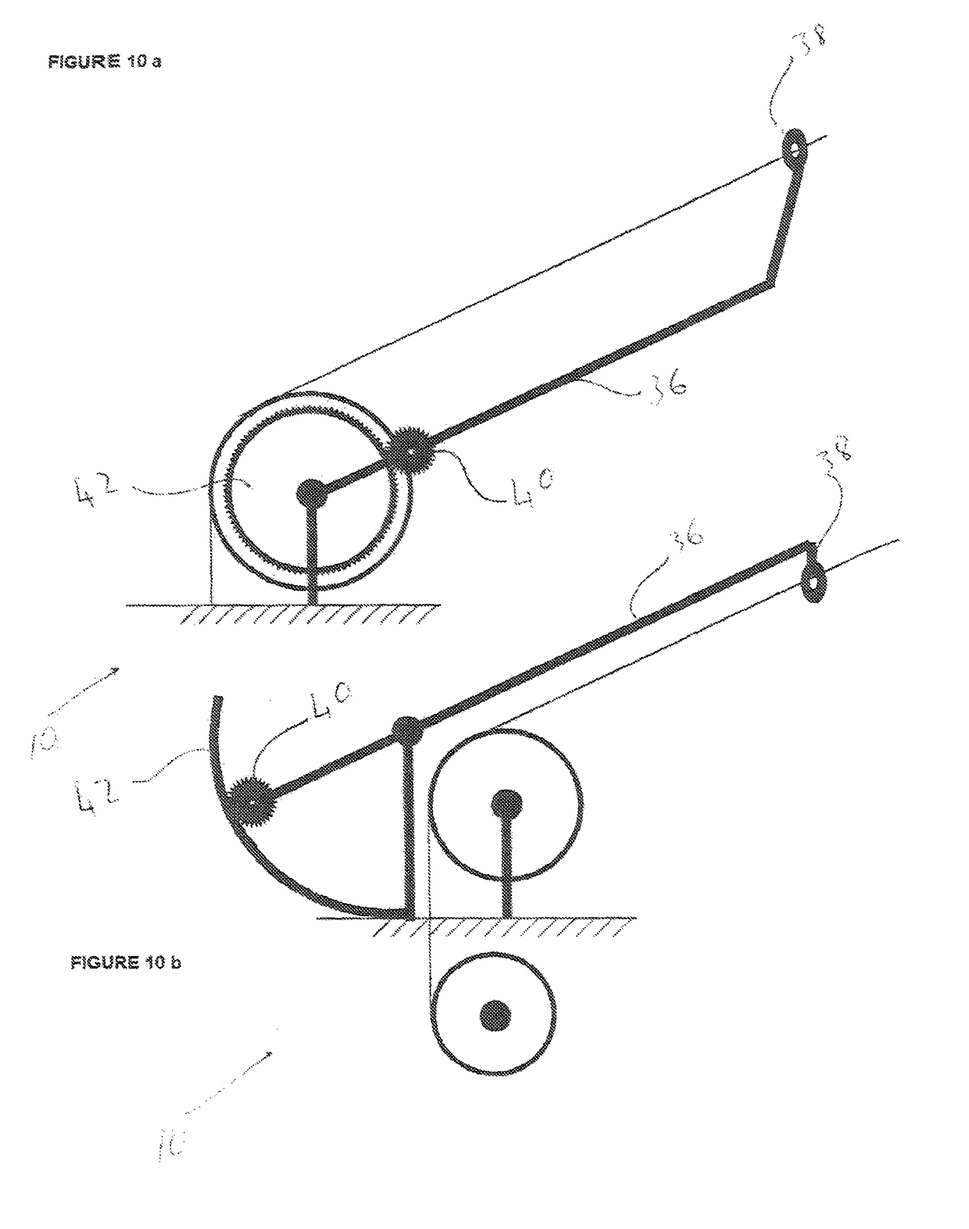

The sensor for sensing the orientation of the first and second set of kite connecting lines 26 and 28 extending from the reels 22 and 24, can be in the form of a shaft 36 with a ring 38 defined at one end, and a cogwheel 40, arranged on an opposing end thereof, as depicted in FIGS. 10a and b. The shaft 36, ring 38 and cogwheel 40 arrangement will typically be arranged about each of the first and second set of reels 22 and 24 with each of the kite connecting lines 26 and 28 extending therefrom and threaded through a ring 38, and connected to the kite canopy 12. Cogwheel 38 is arranged in communication with a secondary cogwheel 42.

In use, the rings 38 will be guided by the direction of the kite connecting lines 26 and 28 in space, which will result in the displacement of the cogwheel 40 relative to the secondary cogwheel 42. The position of cogwheel 40 relative to cogwheel 42 is communicated to the control device indicating the orientation of the kite connecting lines 26 and 28, relative to the bow 30 of the watercraft 14.

The shaft and cogwheel arrangement as described will typically also receive input from the control device, thereby adjusting the angle of the kite connecting lines relative to the watercraft in accordance with a user's requirements.

The orientation of the kite connecting lines 26 and 28 in relation to the bow 30 of the watercraft 14, will be 0 degrees (or 360 degrees), if the kite connecting lines 26 and 28 are parallel to the bow 30 of the watercraft 14, and 90 degrees where the kite connecting lines 26 and 28 run perpendicular to the right (starboard) of the watercraft 14. The orientation of the kite connecting lines 26 and 28 in relation to the bow 30 of the watercraft 14, will be 0 degrees in circumstances where the kite canopy 12 is floating on the water, and 90 degrees if the kite canopy 12 is directly above the base 20 of the watercraft 14.

In use, the orientation measurements taken by the sensors will be transmitted to the control device and will describe the kite's position on a hemisphere, with the radius of the hemisphere determined by the length of the kite connecting lines 26 and 28 extending from the reels 22 and 24, mounted on the base 20.

The control device will interpret the transmitted information to control the kite canopy 12 by manipulating the lengths of the kite connecting lines 26 and 28.

The control device in the form the kite control instrument 46 (FIG. 3) for controlling the kite canopy 12 will typically be located underneath the watercraft 14. The kite control instrument 46 is connected to the first set of reels 22 via a so called central line 48, and to the second set of reels 24, via a pair of lines 50. Central line 48 can also be in the form of a pole 52, instead of a line, as depicted in FIG. 13.

Figure 3:
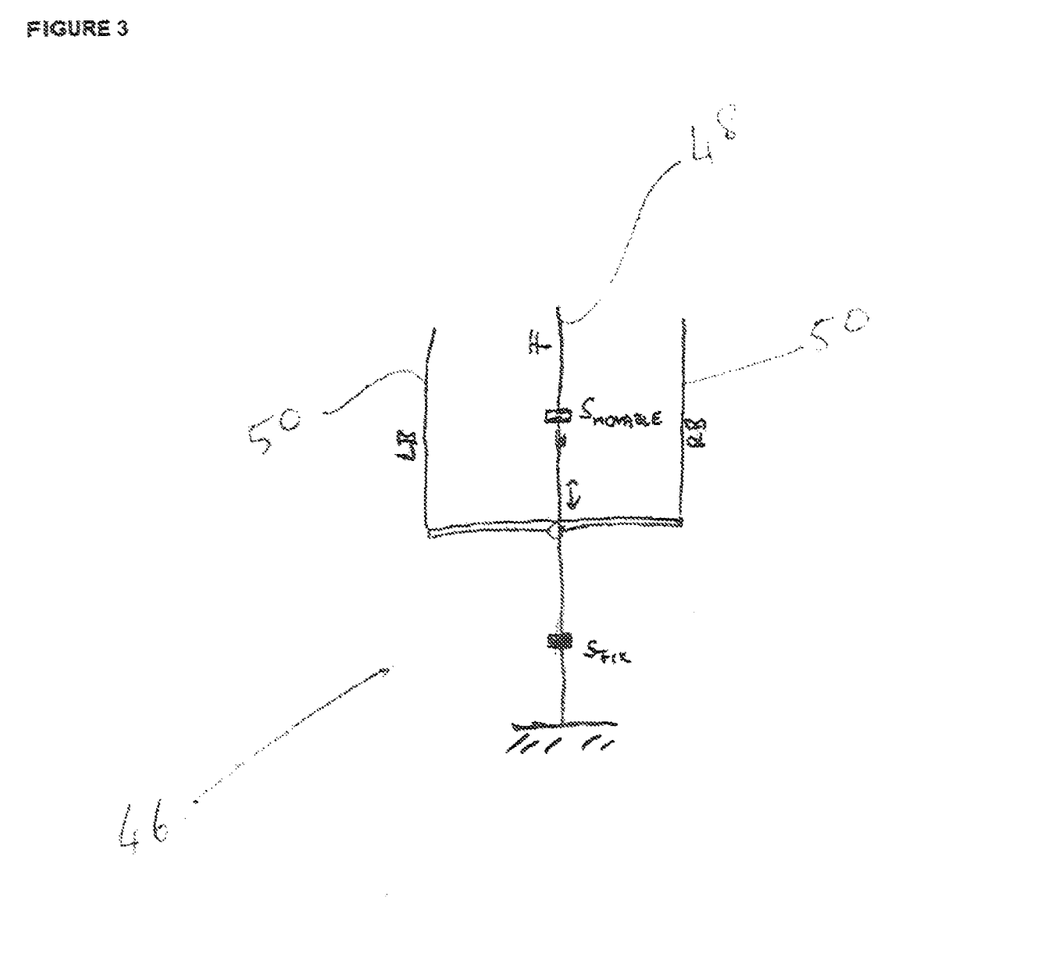
FIG. 3 is a schematic representation of a conventional kite control instrument.

The kite control instrument 46 includes a bar 54, with each of the pair of lines 50, connected to either side of the bar 54. The opposing end regions of the lines 50 are connected to the second set of reels 24, where the second set of reels 24 is connected to the kite canopy 12 via the second set of kite connecting lines 28. The bar 54 is arranged displaceably relative to central line 48, with central line 48 arranged centrally the bar 54, as shown in FIG. 3. Central line 48 further has two stoppers 56 and 58, mounted thereon, so as to determine the lower and upper displacement, respectively, of the bar 54 relative thereto. Central line 48 will be connected to the pilot 44, with the opposing end portion thereof connected to the first set of reels 22, where the first set of reels 22 is connected to the kite canopy 12 via the first set of kite connecting lines 26.

The steering input of the user 44 on the kite control instrument 46 is amplified by a mechanical advantage member in the form of a power steering mechanism (not shown) acting on reels 22 and 24, for the retrieving and releasing of the kite connecting lines 26 and 28. The power steering mechanism can be in the form of electro-motors (not shown) for driving reels 22 and 24.

Figure 11:
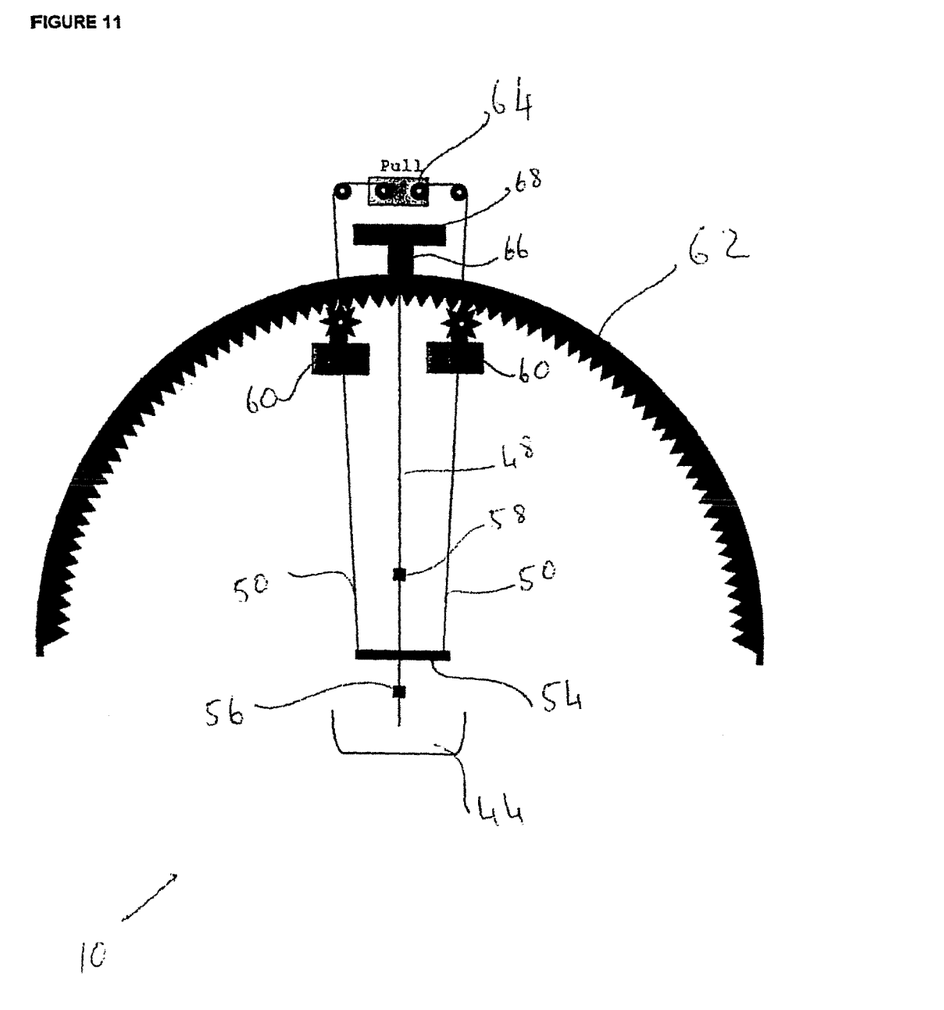
FIG. 11 is a schematic representation of the control device.
Figure 12:
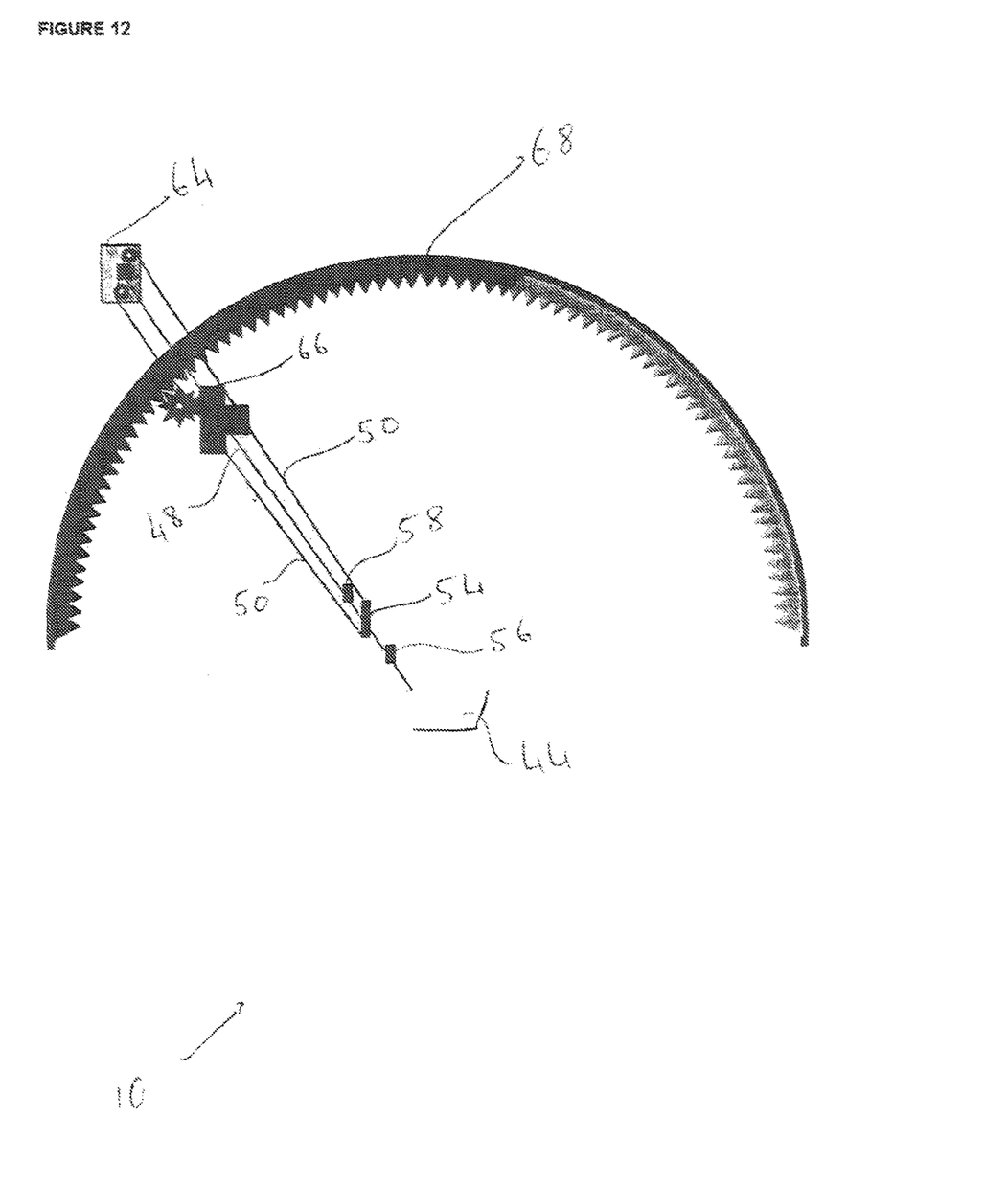
FIG. 12 is a further schematic representation of the control device as depicted in FIG. 11.
Figure 13:
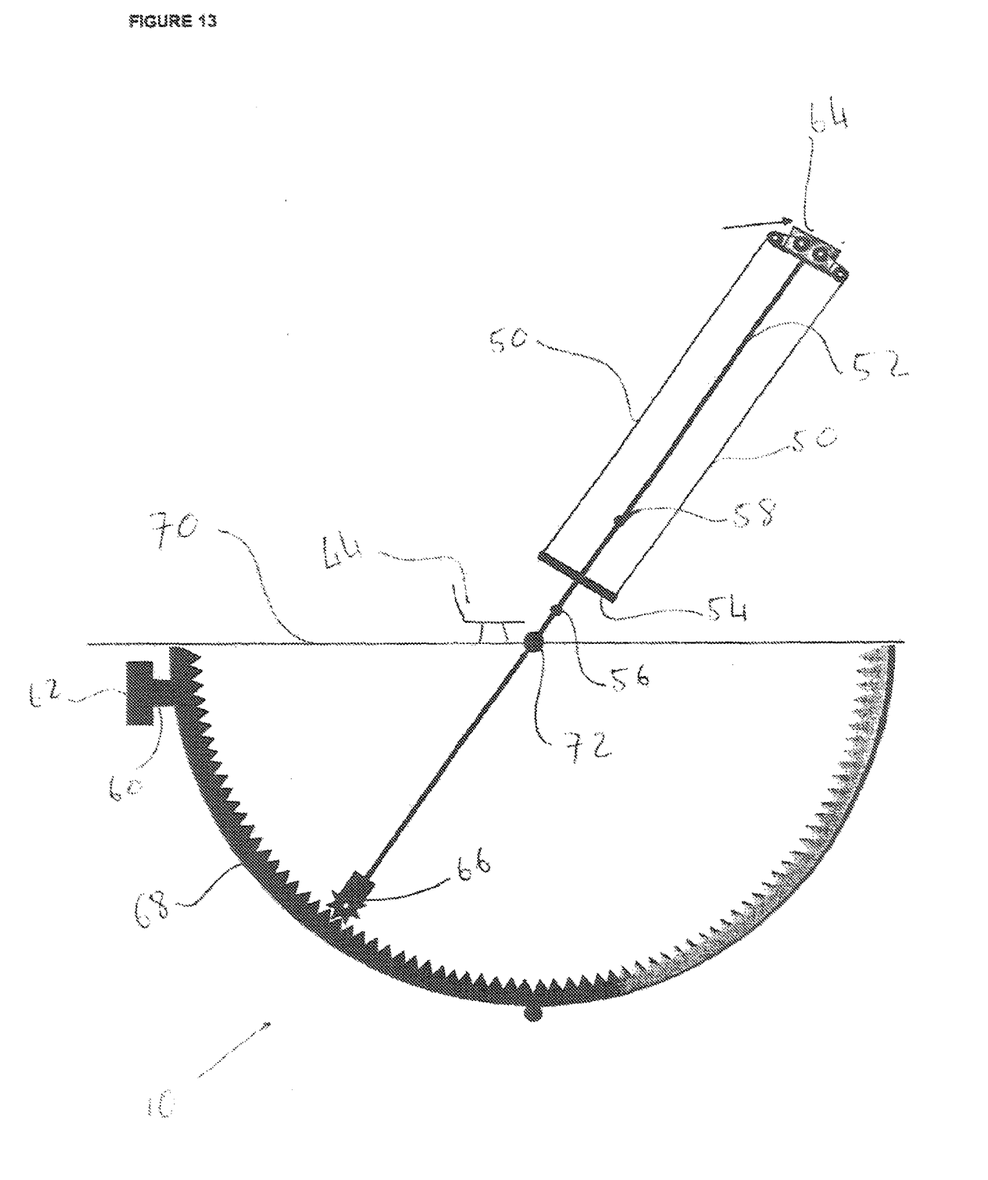
FIG. 13 is yet another embodiment of a control device, in accordance with the invention.

In order for the user or pilot 44, who will typically be located inside the watercraft 14, to have a real time indication of the orientation of the kite connecting lines relative to the bow 30 of the watercraft 14, a simulation member is arranged about the lines 48 and 50, shown in FIGS. 11, 12 and 13. The simulation member will typically receive input from the transmitters as to the orientation of the first and second set of kite connecting lines relative the watercraft, and orientate the lines 48 and 50 accordingly so as to give a user of the kite control instrument inside the watercraft a real time indication of the orientation of the kite connecting lines above the watercraft.

The simulation member can be in the form of electro driven cogwheels arranged in communication with a second cogwheel. The electro-driven cogwheels 60 and 66 will receive input from the sensors 42, and will rotate in a predetermined direction thereby adjusting the position of the lines 48 and 50. As depicted in FIG. 11, electro driven cogwheels 60 are arranged in communication with cogwheel 62 to provide for the horizontal component in positioning lines 48 and 50 to simulate the orientation of kite connecting lines 26 and 28 relative to the bow 30 of the watercraft 14. In FIGS. 12 and 13, electro driven cogwheel 66 is arranged in communication with cogwheel 68 provide for the vertical component in positioning lines 48 and 50 to simulate the orientation of kite connecting lines and 26 and 28 relative to the bow 30 of the watercraft 14.

In use, this adjustment of the orientation of lines 48 and 50, will simulate the orientation of the kite connecting lines 26 and 28, so as to provide the pilot 44 with a real time indication of the positioning of the first and second set of kite connecting lines 26 and 28 relative to the bow 30 of the watercraft 14. With this mechanism the pilot 44 is informed about the position of the kite canopy 12 in the sky, just as any kite-boarder (steering a small kite which lines are directly attached to the bar 54) By receiving constant feedback from the sensors about the kite canopy's position in the sky, the pilot 44 can fly the kite without having a visual thereof.

FIG. 13 is the preferred embodiment of the simulation member for the pilot 44—horizontal and vertical simulator—where the simulation member are hidden from the pilot 44 under a floor 70. The kite control instrument 46 for the pilot 44 is suspended on a pole 52, which in itself is suspended on a ball-and-socket joint 72, where the pole 52 extends through the floor 70 of the pilot 44.

The pilot 44 can either be a skilled human or a computerised device.

In order for the pilot 44 to get a feel for the actual pulling force of the kite canopy 12 on the first and second set of kite connecting lines 26 and 28, sensor 64 is provided for converting the actual pulling into a relative pulling force, shown in FIGS. 11, 12 and 13. The relative pulling force is transmitted to the kite control instrument 46, in order to give the pilot 44 an Indication of the actual pulling force of the kite 12 on the kite connecting lines 26 and 28. The relative pulling force is adjustable by the pilot 44, in order to set the comfortable levels of holding force at bar 54, which should be strong enough to give the pilot 44 enough feedback about the pull of the kite canopy 12, but weak enough not to tire the pilot.

The sensor 64 can be include the transmitter in the form of electro motors (not shown) for transmitting the actual pulling force of the canopy 12 on the kite connecting lines 26 and 28, into a relative pulling force.

Alternatively, a set of springs (not shown) operably connected to lines 48 and 50, could also serve to measure and transmit the pull of the canopy 12 on kite connecting lines 26 and 28 into a relative pulling force.

Figure 5:
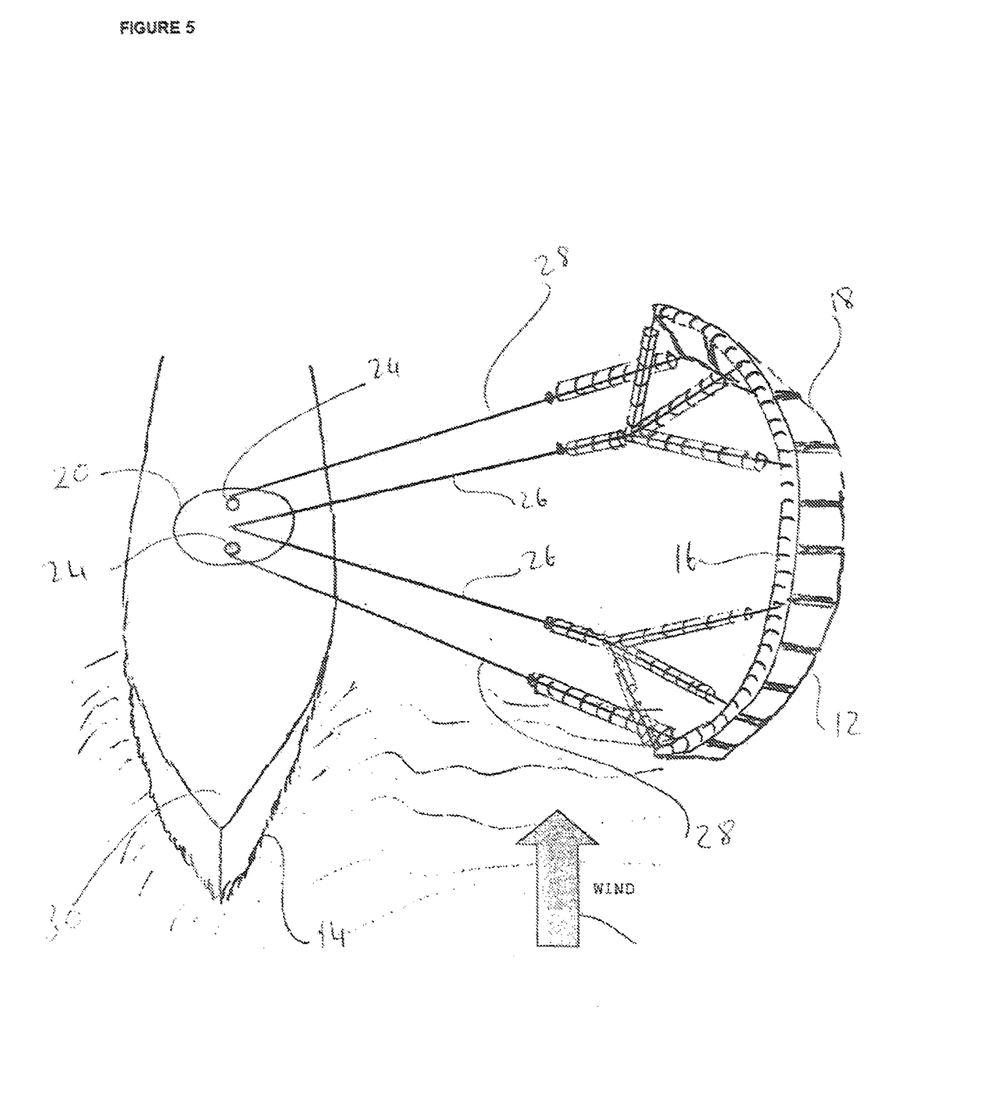
FIG. 5 is a perspective view illustrating the arrangement of the sleeve elements on the elongate members.
Figure 6:
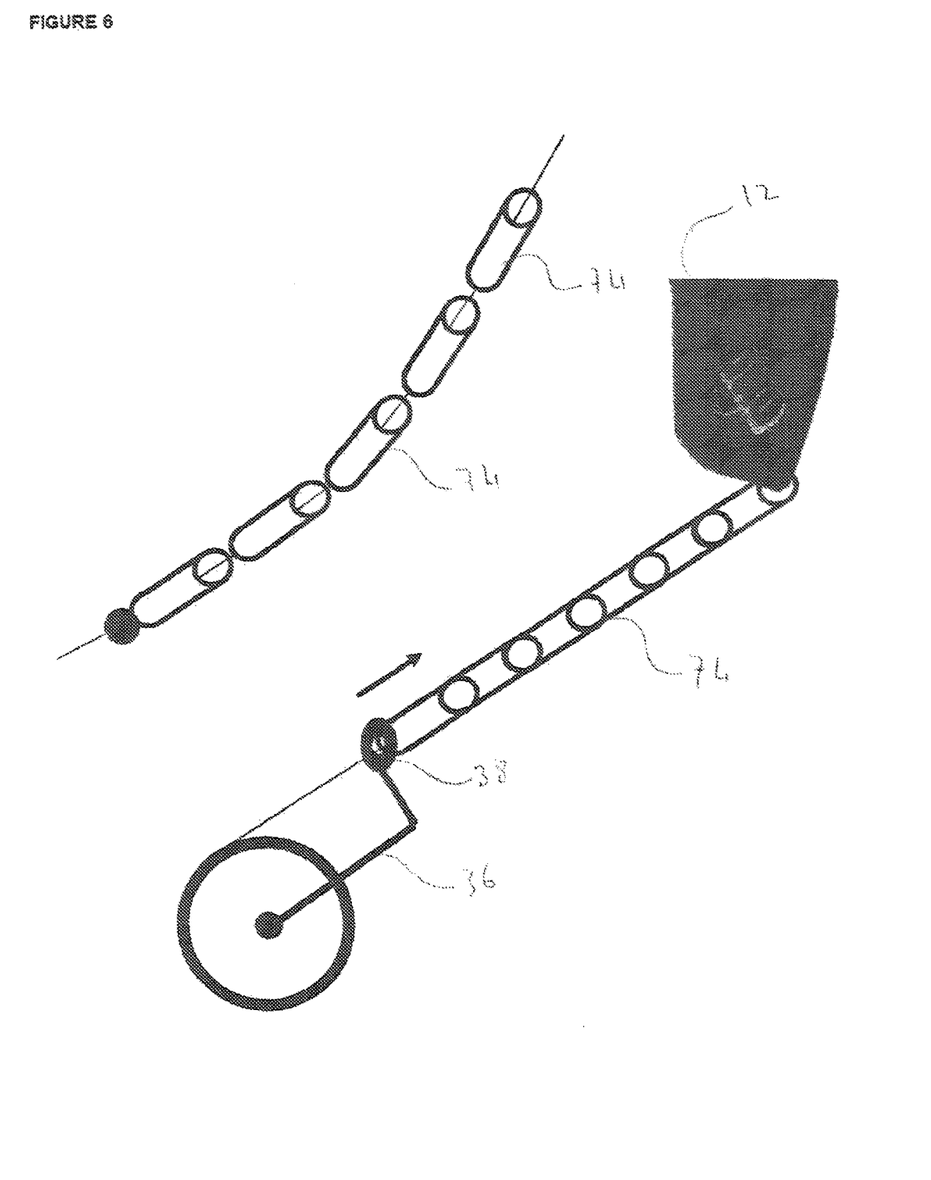
FIG. 6 is a close up view of the sleeve elements arranged on the elongated members as depicted in FIG. 5.
Figure 7:
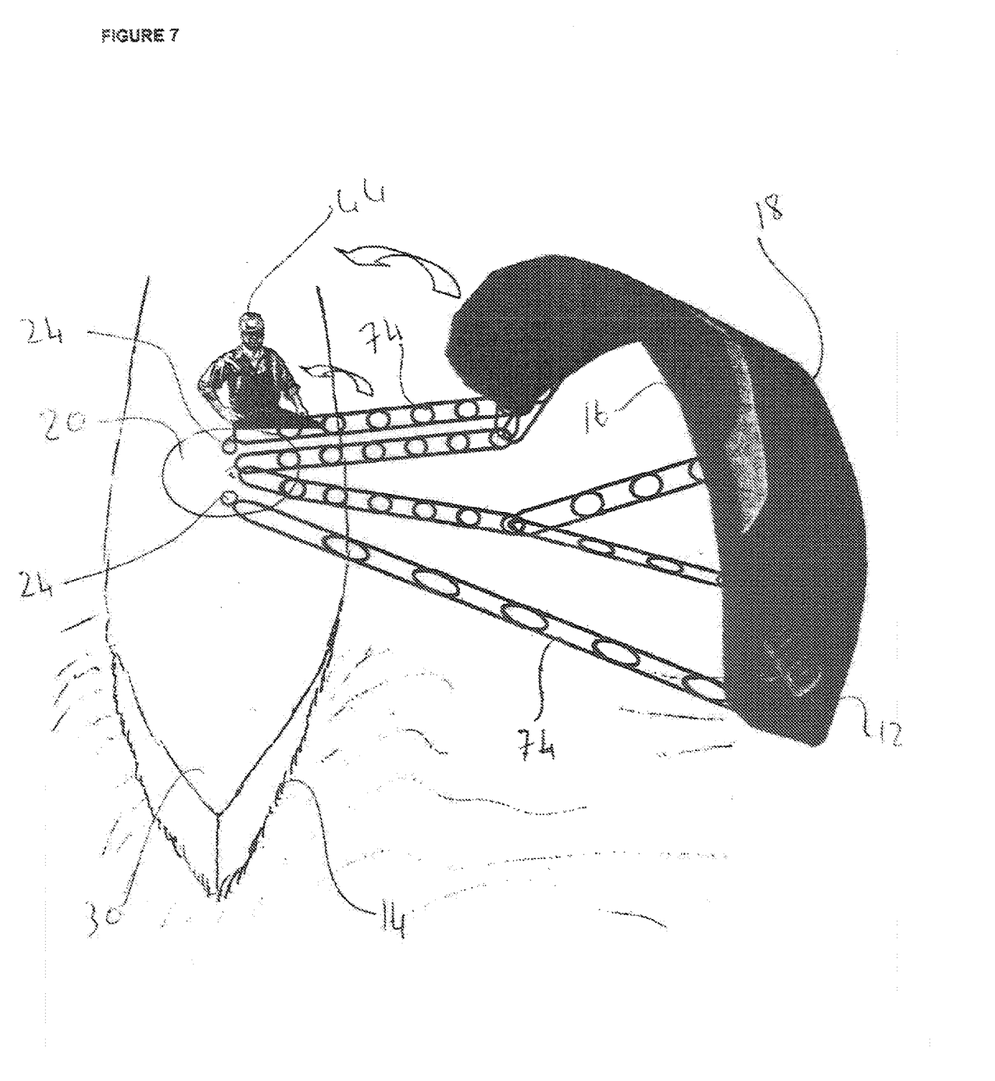
FIG. 7 is a perspective view illustrating the sleeve elements as depicted in FIGS. 5 and 6, pressed together for aiding loading the kite onto a watercraft.

In order to add rigidity to the kite connecting lines 26 and 28, a plurality of cylindrical tubes 74 are arranged co-axially thereon, as shown in FIGS. 5, 6 and 7. The cylindrical tubes 74 are arranged on the kite connecting lines 26 and 28 so that when the reels 22 and 24 retrieve the kite connecting lines, the tubes 74 are pressed together by the ring 38, thereby provide rigidity to the kite connecting lines 26 and 28, for ease of loading the canopy 12 onto the watercraft 14.

Figure 8:
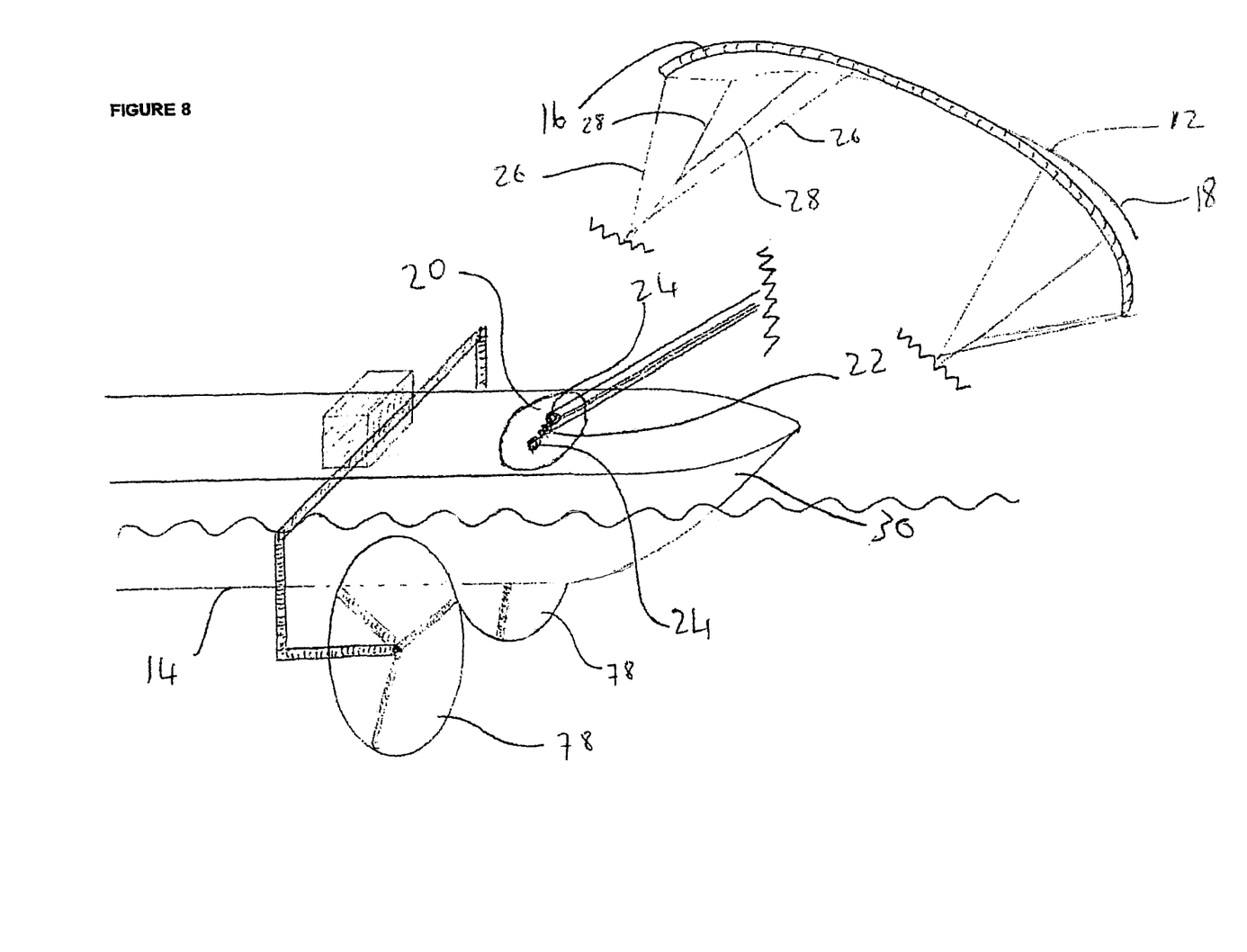
FIG. 8 is perspective view of a further embodiment of a kite driven watercraft including a steering arrangement, in accordance with the invention.

In a preferred embodiment the kite canopy 12 is a LEI (leading edge inflatable) kite, as shown in FIG. 8, which will float on the water in period of Insufficient wind speeds. The ability of the canopy 12 to float on the water in periods of low wind speed, is particularly important in order to assist in the re-launching of the kite when wind speeds are sufficient again. Depending on the circumstances, such as velocity of the wind and the expected time period of low winds, the canopy 12 can either just float on the water and nothing further is done, because there is enough residual wind to keep the lines to the kite straight (but not enough to keep the kite flying in the air), or the reels 22 and 24 can be used to slowly reel in lines 26 and 28 of the kite, until the kite canopy 12 is close to the watercraft 14.

Figure 4:
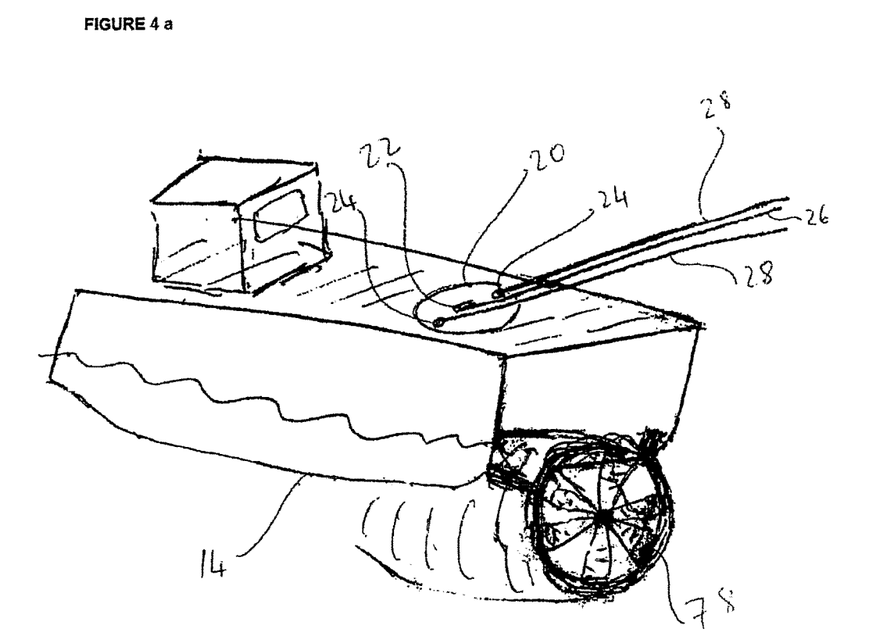

FIGS. 4*a* and *b* depict a kite driven watercraft 14 including a steering arrangement 10 as described above. The watercraft 14 includes one or more hulls 76, with hydro turbines 78 located therein between, for generating mechanical energy as the watercraft 14 is displaced relative a body of water.

The watercraft 14 further will also include a generator 77 for converting mechanical energy into electrical energy. The electrical energy can be stored in batteries (not shown). The mechanical energy can also be used for the electrolysis of seawater, for the manufacturing of hydrogen. The hydrogen can be stored, or alternatively be combined with carbon dioxide to produce methanol and/or methane gas.

Example for Using the Kite Driven Watercraft

First, ideal areas of reliable and high wind speeds are determined, derived from weather statistics (historic), forecasts or actual, current measurements. This may for instance be a region of Passat trade winds.

The fastest route to sail the watercraft to this area is calculated, taking wind forecasts (wind speed and wind direction) for the route into account The watercraft sails to the area of reliable and high wind speeds, while doing so it is producing energy. The watercraft will sail in this area until its capacity for energy storage is almost exhausted, taking into account that the ship will still generate energy on the trip back to the point of energy offload.

Close to the point of arrival, the kite will slowly be reeled in, until the tubes at the end of the lines stiffen the lines for mounting the kite whereafter the energy will be offloaded.

The systems which could assist the fully navigable kite driven watercraft includes:

weather information service, especially wind forecast;
Geo data, map data and GPS software;
Automated kite control;
Routing of the kite driven watercraft to areas of high wind;

All the above processes can be automated or semi-automated. The route of the watercraft can be computed automatically, by a computer system, which is integrated with a weather system and data, a map and geo data system, and GPS navigation system. The latter systems will also ensure that the watercraft stays away from land or shallow waters The fully navigable kite driven watercraft can be integrated with various systems of information to navigate to areas of energy collection, and to navigate back to areas of energy consumption, where the stored energy can be transferred into a pipeline in case of methanol and/or ethanol, or an area for the offloading batteries containing the energy stored as electricity. The watercraft will navigate from any one point on sea to any other point, like a traditional sailing ship, and it can successfully operate in all wind conditions. Whenever there are conditions with solid wind (depending on the exact construction of the kite, 6-9 knots of wind speed) the watercraft will generate green energy from wind power and the energy so generated will be stored as electricity in batteries, and/or methane gas and/or methanol. The watercraft will typically be navigated to areas of reliable and strong winds, e.g. the Passat trade wind belts, generating energy and navigate back to areas of high energy consumption, to offload or feed the stored energy into power grids, and/or pipelines and/or gas or fuel tankers. The burning of the generated fuel or gas will be neutral in terms of CO2 emission or pollution emission and no valuable space or land will be required or disfigured by this safe, green energy generating system, as it will mostly operate far away on the ocean and therefore be invisible to the human eye.

Accordingly it is an object of this invention to provide a steering arrangement for a kite driven watercraft, which will allow a pilot (natural person or computerised device), to effectively steer the kite canopy without the need of having a constant visual of the kite, or a feel of the actual pull of the kite, as is normally necessary in the effective steering of a kite. The kite steering arrangement as described above for the steering of a kite driven watercraft, can also be used in small kite boats and for racing kite boats or speed sailing kite boats, whenever direct control and contact of the pilot via the kite control instrument to the kite is inconvenient or impossible, for example due to strong pulling forces of the kite on the kite connecting lines.

It is to be appreciated that a steering arrangement as hereinbefore described is not limited to the precise functional and constructional details as set out above and that the composing parts such as the sensors, transmitters, connecting members, mounting member and control device may be varied without departing from the spirit of the invention.

The invention claimed is:

1. A steering arrangement for steering a kite driven watercraft which includes:
   a mounting member which is mounted displaceably on the watercraft;
   a first connecting member for connecting a leading edge region of a kite canopy to the mounting member;
   the first connecting member comprising a first elongate member and a first length adjustment member for adjusting the length of the first elongate member;
   a second connecting member for connecting a trailing edge region of the kite canopy to the mounting member;
   the second connecting member including a second elongate member and a second length adjustment member for adjusting the length of the second elongate member;
   at least one sensor for measuring the position and orientation of at least one of the elongate members relative to the watercraft;
   at least one transmitter in communication with the at least one sensor for transmitting the position and orientation of the at least one elongate member to a control device;
   wherein the control device is configured to control displacement of the kite canopy relative the watercraft via adjustment of the length of at least one elongate member.

2. A steering arrangement for steering a kite driven watercraft as claimed in claim 1 wherein the control device includes a mechanical advantage member for controlling at least one length adjustment member, and thereby the length of at least one elongate member, so as to manoeuvre the kite into a preferred orientation relative the watercraft.

3. A steering arrangement for steering a kite driven watercraft as claimed in claim 1 wherein the control device includes a simulation member to receive information about the spatial orientation of the first elongate member from the at least one transmitter and to position the control device accordingly to thereby give a user a real time indication of the spatial orientation of the first elongate member, and thereby of the kite, relative the watercraft.

4. A steering arrangement for steering a kite driven watercraft as claimed in claim 1 wherein a sensor is provided for sensing the position and orientation of the mounting member relative to the watercraft.

5. A steering arrangement for steering a kite driven watercraft as claimed in claim 4 wherein the sensor includes a gear arrangement.

6. A steering arrangement for steering a kite driven watercraft as claimed in claim 5 wherein the gear arrangement is in the form of a rack and pinion gear arrangement with the rack being defined on a peripheral region of the mounting member.

7. A steering arrangement for steering a kite driven watercraft as claimed in claim 4 wherein the sensor includes an electronic sensing device.

8. A steering arrangement for steering a kite driven watercraft as claimed in claim 4 wherein the sensor includes a transmitter for transmitting the position and orientation of the mounting member relative the watercraft, to the control device.

9. A steering arrangement for steering a kite driven watercraft as claimed in claim 1 wherein the first connecting member includes a first angle adjustment member for adjusting the angle of the first elongate member relative to the watercraft.

10. A steering arrangement for steering a kite driven watercraft as claimed in claim 1 wherein the second connecting member includes a second angle adjustment member for adjusting the angle of the second elongate member relative to the watercraft.

11. A steering arrangement for steering a kite driven watercraft as claimed in claim 10 wherein the at least one sensor includes a rack and pinion arrangement.

12. A steering arrangement for steering a kite driven watercraft as claimed in claim 10 wherein the at least one sensor includes an electronic device.

13. A steering arrangement for steering a kite driven watercraft as claimed in claim 1 wherein the at least one sensor is configured to measure the position and orientation of the second elongate member relative to the watercraft.

14. A steering arrangement for steering a kite driven watercraft as claimed in claim 13 wherein the at least one sensor includes a rack and pinion arrangement.

15. A steering arrangement for steering a kite driven watercraft as claimed in claim 13 wherein the at least one sensor includes an electronic device.

16. A steering arrangement for steering a kite driven watercraft as claimed in claim 1 wherein a sensor is provided for measuring actual tensional forces experienced by the first elongate member, the sensor further being configured to translate the actual tensional force into a relative tensional force and to transmit said relative tensional force to the control device, thereby giving a user of the control device an indication of the actual tensional forces experienced by the first elongate member.

17. A steering arrangement for steering a kite driven watercraft as claimed in claim 1 wherein a sensor is provided for measuring actual tensional forces experienced by the second elongate member, the sensor further being configured to translate the actual tensional force into a relative tensional force and to transmit the said relative tensional force to the control device, thereby giving a user of the control device an indication of the actual tensional forces experienced by the second elongate member.

18. A steering arrangement for steering a kite driven watercraft as claimed in claim 16 wherein the control device is configured to translate the relative tensional force experienced by the first elongate member into a mechanical pulling force of the control device.

19. A steering arrangement for steering a kite driven watercraft as claimed in claim 17 wherein the control device is configured to translate the relative tensional force experienced by the second elongate member into a mechanical pulling force of the control device.

20. A steering arrangement for steering a kite driven watercraft as claimed in claim 1 wherein sleeve elements are mounted co-axially the first elongate member to facilitate the transfer of the kite from a body of water onto the watercraft.

21. A steering arrangement for steering a kite driven watercraft as claimed in claim 1 wherein sleeve elements are mounted co-axially the second elongate member to facilitate the transfer of the kite from a body of water onto the watercraft.

22. A kite driven watercraft including a steering arrangement for steering the watercraft as claimed in claim 1 wherein the watercraft includes a generator for generating mechanical energy as the watercraft is pulled through a body of water.

23. A kite driven watercraft including a steering arrangement for steering the watercraft as claimed in claim 22 wherein the generator is in the form of a hydro turbine.

24. A kite driven watercraft including a steering arrangement for steering the watercraft claimed in claim 22 wherein the generator is in the form of a paddle.

25. A kite driven watercraft including a steering arrangement for steering the watercraft as claimed in claim 22 wherein the generator is in the form of a propeller.

26. A kite driven watercraft including a steering arrangement for steering the watercraft as claimed in claim 1 wherein the watercraft includes a convertor for converting mechanical energy into electrical energy.

27. A kite driven watercraft including a steering arrangement for steering the watercraft as claimed in claim 26 wherein the convertor is configured to manufacture hydrogen.

28. A kite driven watercraft including a steering arrangement for steering the watercraft as claimed in claim 27 wherein the hydrogen is combined with carbon dioxide to produce methanol.

29. A kite driven watercraft including a steering arrangement for steering the watercraft as claimed in claim 27 wherein the hydrogen is combined with carbon dioxide to produce methane gas.

30. A steering arrangement for steering a kite driven watercraft as claimed in claim 1 wherein the control device includes a simulation member for receiving information about the spatial orientation of the second elongate member from the at least one transmitter and to position the control device accordingly to thereby give a user a real time indication of the spatial orientation of the second elongate member, and thereby of the kite, relative the watercraft.

31. A steering arrangement for a kite driven watercraft as claimed in claim 1 wherein the control device includes a simulation member for receiving information about the spatial orientation of the mounting member and to position the control device accordingly, to thereby give a user a real time indication of the spatial orientation of the elongate members, and thereby of the kite, relative the watercraft.

32. A steering arrangement for steering a kite driven watercraft as claimed in claim 1 wherein the at least one sensor is configured to measure the position and orientation of the first elongate member relative to the watercraft.

33. A steering arrangement for a kite driven watercraft as claimed in claim 18 wherein the control device is configured to allow a user to adjust the mechanical pulling force of the control device to a desired level.

34. A steering arrangement for a kite driven watercraft as claimed in claim 19 wherein the control device is configured to allow a user to adjust the mechanical pulling force of the control device to a desired level.

35. A steering arrangement for a kite driven watercraft as claimed in claim 1 wherein the control device includes a mechanical advantage member for controlling at least one length adjustment member in response to the input received from the at least one sensor, and thereby the length of at least one elongate member, so as to maneuver the kite into a preferred orientation relative the watercraft.

36. A steering arrangement for a kite driven watercraft as claimed in claim 1 wherein the control device includes a receiver for receiving input from the at least one sensor for maneuvering the kite into a preferred zone by manipulating the first elongate member.

37. A steering arrangement for a kite driven watercraft as claimed in claim 1 wherein the control device includes a receiver for receiving input from the at least one sensor for maneuvering the kite into a preferred zone by manipulating the second elongate member.

38. A steering arrangement for a kite driven watercraft as claimed in claim 1 wherein the control device includes a mechanical advantage member for controlling the first length adjustment member in response to the input received from the at least one sensor.

39. A steering arrangement for a kite driven watercraft as claimed in claim 1 wherein the control device includes a mechanical advantage member for controlling the second length adjustment member in response to the input received from the at least one sensor.

* * * * *